(12) United States Patent
Faist et al.

(10) Patent No.: US 10,322,682 B2
(45) Date of Patent: *Jun. 18, 2019

(54) STEERING WHEEL WITH KEYBOARD

(71) Applicant: Steering Solutions IP Holding Corporation, Saginaw, MI (US)

(72) Inventors: Bryan L. Faist, Frankenmuth, MI (US); Richard P. Nash, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/059,622

(22) Filed: Mar. 3, 2016

(65) Prior Publication Data

US 2017/0253192 A1 Sep. 7, 2017

(51) Int. Cl.
| | |
|---|---|
| *B60R 11/00* | (2006.01) |
| *B60R 11/02* | (2006.01) |
| *B60R 16/027* | (2006.01) |
| *B62D 1/04* | (2006.01) |
| *G06F 3/02* | (2006.01) |
| *B62D 1/10* | (2006.01) |
| *B60K 35/00* | (2006.01) |
| *B60K 37/06* | (2006.01) |

(52) U.S. Cl.
CPC .......... *B60R 11/0264* (2013.01); *B60K 35/00* (2013.01); *B60K 37/06* (2013.01); *B60R 16/027* (2013.01); *B62D 1/046* (2013.01); *B62D 1/10* (2013.01); *G06F 3/0221* (2013.01); *G06F 3/0227* (2013.01); *B60K 2350/405* (2013.01); *B60K 2350/406* (2013.01); *B60K 2350/928* (2013.01); *B60R 2011/001* (2013.01)

(58) Field of Classification Search
None
See application file for complete search history.

(56) References Cited

U.S. PATENT DOCUMENTS

| | | |
|---|---|---|
| 3,011,802 A | 12/1961 | Ackerman |
| 3,643,606 A | 2/1972 | Vise |
| 3,937,101 A | 2/1976 | Wade |
| 4,287,621 A | 9/1981 | Kertz |
| 4,337,967 A | 7/1982 | Yoshida et al. |

(Continued)

FOREIGN PATENT DOCUMENTS

| | | |
|---|---|---|
| CN | 1080604 A | 1/1994 |
| CN | 2483289 Y | 3/2002 |

(Continued)

OTHER PUBLICATIONS

Chinese Office Action and Search Report dated Nov. 24, 2017 for Chinese Application No. 201610287651.2, English Translation, 10 pages.

(Continued)

*Primary Examiner* — Xanthia C Cunningham
(74) *Attorney, Agent, or Firm* — Cantor Colburn LLP

(57) ABSTRACT

A steering wheel assembly is provided. The steering wheel assembly includes a steering wheel body having a first surface and a second surface disposed opposite the first surface. The first surface has a keyboard template defined thereon. The keyboard template includes a plurality of key areas.

15 Claims, 5 Drawing Sheets

(56) References Cited

U.S. PATENT DOCUMENTS

| | | | |
|---|---|---|---|
| 4,453,788 A | 6/1984 | Russell | |
| 4,464,933 A * | 8/1984 | Santis | B60K 35/00 116/62.4 |
| 4,503,504 A | 3/1985 | Suzumura et al. | |
| 4,638,131 A * | 1/1987 | Kidd | B60Q 1/0082 200/5 A |
| 4,967,618 A | 11/1990 | Matsumoto et al. | |
| 5,060,581 A | 10/1991 | Malinski | |
| 5,177,665 A | 1/1993 | Frank et al. | |
| 5,178,411 A | 1/1993 | Fevre et al. | |
| 5,181,759 A | 1/1993 | Doolittle | |
| 5,193,777 A | 3/1993 | Faulstich | |
| 5,295,712 A | 3/1994 | Omura | |
| 5,319,803 A * | 6/1994 | Allen | B60R 11/0264 455/345 |
| 5,487,521 A | 1/1996 | Callahan | |
| 5,542,314 A * | 8/1996 | Sullivan | B60R 11/0252 211/119 |
| 5,555,502 A | 9/1996 | Opel | |
| 5,618,058 A | 4/1997 | Byon | |
| 5,662,047 A | 9/1997 | Metcalf | |
| 5,690,362 A | 11/1997 | Peitsmeier et al. | |
| 5,691,695 A | 11/1997 | Lahiff | |
| 5,821,935 A | 10/1998 | Hartman et al. | |
| 5,893,580 A | 4/1999 | Hoagland et al. | |
| 5,911,789 A | 6/1999 | Keipert et al. | |
| 6,170,862 B1 | 1/2001 | Hoagland et al. | |
| 6,174,097 B1 | 1/2001 | Daniel | |
| 6,227,425 B1 | 5/2001 | Ware, Sr. | |
| 6,227,571 B1 | 5/2001 | Sheng et al. | |
| 6,249,744 B1 * | 6/2001 | Morita | B62J 99/00 340/988 |
| 6,305,217 B1 * | 10/2001 | Mansfeld | G12B 9/08 224/276 |
| 6,360,149 B1 | 3/2002 | Kwon et al. | |
| 6,373,472 B1 | 4/2002 | Palalau et al. | |
| 6,390,505 B1 | 5/2002 | Wilson | |
| 6,526,335 B1 * | 2/2003 | Treyz | G01C 21/26 307/10.1 |
| 6,532,152 B1 | 3/2003 | White et al. | |
| 6,669,233 B2 | 12/2003 | Gabriel | |
| 6,760,569 B1 * | 7/2004 | Chen | B60R 11/0264 379/454 |
| 6,819,990 B2 | 11/2004 | Ichinose | |
| 7,048,305 B2 | 5/2006 | Muller | |
| 7,062,365 B1 | 6/2006 | Fei | |
| 7,126,583 B1 | 10/2006 | Breed | |
| 7,236,355 B2 | 6/2007 | Kim | |
| D547,244 S * | 7/2007 | Munger | D12/177 |
| 7,295,904 B2 | 11/2007 | Kanevsky et al. | |
| 7,315,291 B2 | 1/2008 | Yoshihara et al. | |
| 7,461,863 B2 | 12/2008 | Muller | |
| 7,474,204 B2 * | 1/2009 | Songwe, Jr. | B60K 35/00 296/37.12 |
| 7,611,198 B2 | 11/2009 | Schweizer | |
| 7,735,405 B2 | 6/2010 | Parks | |
| 7,775,584 B2 | 8/2010 | Hughes et al. | |
| 7,793,980 B2 | 9/2010 | Fong | |
| 7,862,079 B2 | 1/2011 | Fukawatase et al. | |
| 7,894,951 B2 | 2/2011 | Norris et al. | |
| 8,002,075 B2 | 8/2011 | Markfort | |
| 8,079,312 B2 | 12/2011 | Long | |
| 8,146,945 B2 | 4/2012 | Born et al. | |
| 8,260,482 B1 | 9/2012 | Szybalski et al. | |
| 8,352,110 B1 | 1/2013 | Szybalski et al. | |
| 8,474,860 B2 | 7/2013 | Ohoka et al. | |
| 8,538,628 B2 | 9/2013 | Backman | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,662,364 B2 * | 3/2014 | Vuillet | B60R 11/0264 224/276 |
| 8,670,891 B1 | 3/2014 | Szybalski et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,096,130 B2 | 8/2015 | Pechnyk et al. | |
| 9,132,787 B2 * | 9/2015 | Cooper | B60R 11/02 |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 9,442,289 B2 | 9/2016 | Nishima et al. | |
| 9,552,148 B2 | 1/2017 | Kim et al. | |
| 9,821,726 B2 * | 11/2017 | Nash | B60R 11/0264 |
| 9,834,121 B2 * | 12/2017 | Riefe | B60N 3/005 |
| 9,845,103 B2 * | 12/2017 | Lubischer | B62D 1/183 |
| 10,065,655 B2 | 9/2018 | Bendewald et al. | |
| 2002/0068605 A1 * | 6/2002 | Stanley | B60R 11/0264 455/556.1 |
| 2002/0073899 A1 | 6/2002 | Chen | |
| 2003/0227159 A1 | 12/2003 | Muller | |
| 2004/0011835 A1 * | 1/2004 | Kim | B60J 3/0204 224/312 |
| 2005/0076815 A1 * | 4/2005 | Twyford | B60N 3/005 108/44 |
| 2006/0107878 A1 * | 5/2006 | Cassata | B60N 3/005 108/44 |
| 2006/0146074 A1 | 7/2006 | Harrison | |
| 2006/0244251 A1 | 11/2006 | Muller | |
| 2006/0286944 A1 * | 12/2006 | Songwe, Jr. | B60K 35/00 455/99 |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0099465 A1 | 5/2007 | Ruetz | |
| 2007/0205875 A1 | 9/2007 | De Haan | |
| 2007/0241548 A1 | 10/2007 | Fong | |
| 2008/0249668 A1 | 10/2008 | Miyata et al. | |
| 2009/0027234 A1 * | 1/2009 | Lee | B60N 3/004 341/22 |
| 2009/0084291 A1 | 4/2009 | Long | |
| 2009/0139778 A1 * | 6/2009 | Butler | G06F 1/1626 178/18.03 |
| 2009/0229485 A1 | 9/2009 | Parks | |
| 2010/0184406 A1 | 7/2010 | Schrader | |
| 2010/0222976 A1 | 9/2010 | Haug | |
| 2010/0228417 A1 | 9/2010 | Lee et al. | |
| 2010/0253652 A1 * | 10/2010 | Homma | G06F 3/016 345/177 |
| 2010/0288567 A1 | 11/2010 | Bonne | |

(56) References Cited

U.S. PATENT DOCUMENTS

| | | |
|---|---|---|
| 2011/0101058 A1 | 5/2011 | Heckman |
| 2011/0305494 A1* | 12/2011 | Kang .................. G06F 3/0202 400/489 |
| 2012/0028682 A1* | 2/2012 | Danne ................ H04M 1/6083 455/557 |
| 2012/0074674 A1 | 3/2012 | Ohoka et al. |
| 2012/0136540 A1 | 5/2012 | Miller |
| 2012/0223200 A1* | 9/2012 | Cooper .................. B60R 11/02 248/309.1 |
| 2012/0271500 A1* | 10/2012 | Tsimhoni ................ B62D 1/28 701/23 |
| 2012/0287050 A1* | 11/2012 | Wu ........................ G06F 1/1673 345/168 |
| 2013/0002416 A1 | 1/2013 | Gazit |
| 2013/0292955 A1 | 11/2013 | Higgins et al. |
| 2013/0325202 A1 | 12/2013 | Howard et al. |
| 2014/0062891 A1 | 3/2014 | Powell |
| 2014/0111324 A1 | 4/2014 | Lisseman et al. |
| 2014/0131403 A1 | 5/2014 | Wright |
| 2014/0195096 A1 | 7/2014 | Schliep et al. |
| 2014/0277896 A1 | 9/2014 | Lathrop et al. |
| 2014/0292661 A1* | 10/2014 | Graumann ............. B62D 1/046 345/168 |
| 2014/0300479 A1 | 10/2014 | Wolter et al. |
| 2014/0309816 A1 | 10/2014 | Stefan et al. |
| 2014/0311880 A1* | 10/2014 | Krumpelman ......... H01H 13/14 200/5 A |
| 2015/0002404 A1 | 1/2015 | Hooton |
| 2015/0009010 A1* | 1/2015 | Biemer .................. G06F 21/32 340/5.83 |
| 2015/0032322 A1 | 1/2015 | Wimmer et al. |
| 2015/0051780 A1 | 2/2015 | Hahne |
| 2015/0120142 A1 | 4/2015 | Park et al. |
| 2015/0191169 A1* | 7/2015 | Fairgrieve .............. B60K 28/16 701/93 |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283926 A1 | 10/2015 | Hamdoon et al. |
| 2015/0283998 A1 | 10/2015 | Lind et al. |
| 2015/0324111 A1 | 11/2015 | Jubner et al. |
| 2016/0001781 A1* | 1/2016 | Fung .................... G06F 19/345 701/36 |
| 2016/0001807 A1* | 1/2016 | Hans .................... B62D 1/046 345/173 |
| 2016/0039457 A1 | 2/2016 | Klank et al. |
| 2016/0071662 A1* | 3/2016 | Cai ........................ H01H 13/14 200/314 |
| 2016/0082867 A1 | 3/2016 | Sugioka et al. |
| 2016/0114770 A1 | 4/2016 | Lombrozo |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0304123 A1 | 10/2016 | Lewis et al. |
| 2016/0325662 A1* | 11/2016 | Nash ...................... B60N 3/005 |
| 2016/0347347 A1 | 12/2016 | Lubischer et al. |
| 2016/0347348 A1 | 12/2016 | Lubischer et al. |
| 2016/0368522 A1 | 12/2016 | Lubischer et al. |
| 2016/0375770 A1 | 12/2016 | Ryne et al. |
| 2016/0375924 A1* | 12/2016 | Bodtker ................ B62D 1/046 74/552 |
| 2016/0375926 A1* | 12/2016 | Lubischer ............. B62D 1/183 74/493 |
| 2016/0375927 A1 | 12/2016 | Schulz et al. |
| 2016/0375931 A1 | 12/2016 | Lubischer et al. |
| 2017/0029018 A1 | 2/2017 | Lubischer et al. |
| 2017/0113589 A1 | 4/2017 | Riefe |
| 2017/0253191 A1 | 9/2017 | Nash et al. |
| 2018/0086297 A1 | 3/2018 | Bodtker et al. |

FOREIGN PATENT DOCUMENTS

| | | |
|---|---|---|
| CN | 2527486 Y | 12/2002 |
| CN | 2734582 Y | 10/2005 |
| CN | 201046685 Y | 4/2008 |
| CN | 101855121 A | 10/2010 |
| CN | 201694075 U | 1/2011 |
| CN | 102910199 A | 2/2013 |
| CN | 103448785 A | 12/2013 |
| CN | 204037399 U | 12/2014 |
| CN | 104512458 A | 4/2015 |
| CN | 104684792 A | 6/2015 |
| DE | 2025003 A | 12/1971 |
| DE | 20014731 U1 | 1/2002 |
| DE | 202005020169 U1 | 7/2007 |
| DE | 102005053176 A1 | 10/2007 |
| DE | 102010050699 A1 | 8/2011 |
| DE | 102013110865 A1 | 4/2015 |
| DE | 102016001257 A1 | 9/2016 |
| EP | 0992395 A2 | 4/2000 |
| EP | 2746134 A1 | 6/2014 |
| FR | 2779695 A1 | 12/1999 |
| FR | 2983134 A1 | 5/2013 |
| FR | 2983147 A1 | 5/2013 |
| JP | S60157963 A | 8/1985 |
| JP | 61142673 U | 9/1986 |
| JP | S63305055 A | 12/1988 |
| JP | H11314542 A | 11/1999 |
| JP | 2002225724 A | 8/2002 |
| JP | 2007253809 A | 10/2007 |
| JP | 2013025620 A | 2/2013 |
| KR | 20070069100 A | 7/2007 |
| KR | 20130080915 A | 7/2013 |
| WO | 2007021263 A1 | 2/2007 |
| WO | 2014166685 A1 | 10/2014 |

OTHER PUBLICATIONS

English Translation of Chinese Office Action and Search Report for Chinese Application No. 201610366609.X dated Dec. 20, 2017, 16 pages.

English Translation of Chinese Office Action and Search Report for Chinese Application No. 201610491464.6 dated Jan. 19, 2018, 8 pages.

English Translation of Chinese Office Action and Search Report for Chinese Application No. 201610830167.X dated Feb. 24, 2018, 11 pages.

English Translation of Chinese Office Action and Search Report for Chinese Application No. 201610830169.9 dated Feb. 26, 2018, 12 pages.

English Translation of Chinese Office Action and Search Report for Chinese Application No. 201611114139.4 dated May 4, 2018, 11 pages.

Chinese Office Action and Search Report for CN Application No. 201710123930.X dated Sep. 5, 2018, 14 pages, English Translation Included.

Chinese Office Action and Search Report for CN Application No. 201710124658.7 dated Sep. 27, 2018, 25 pages, English Translation Included.

* cited by examiner

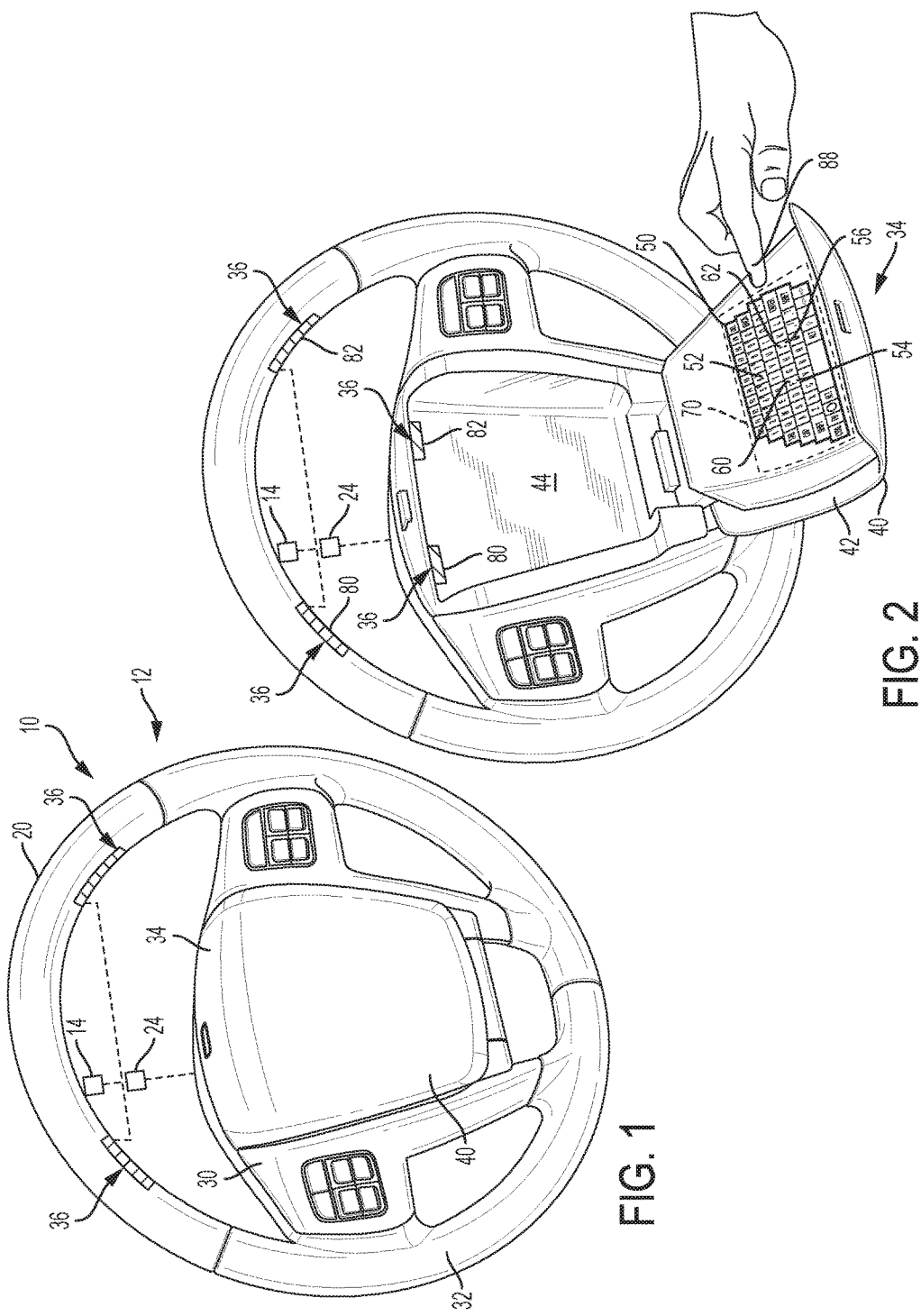

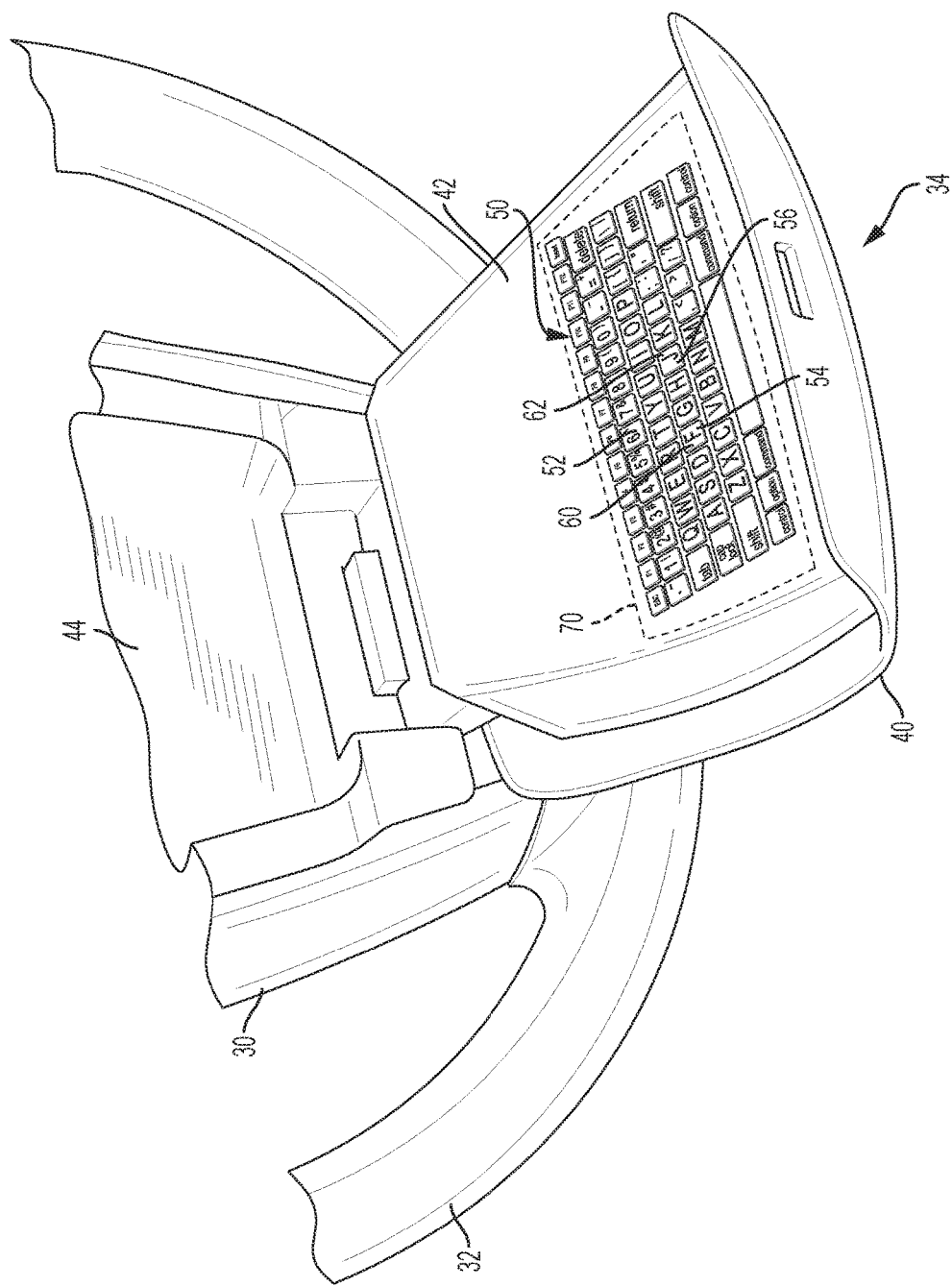

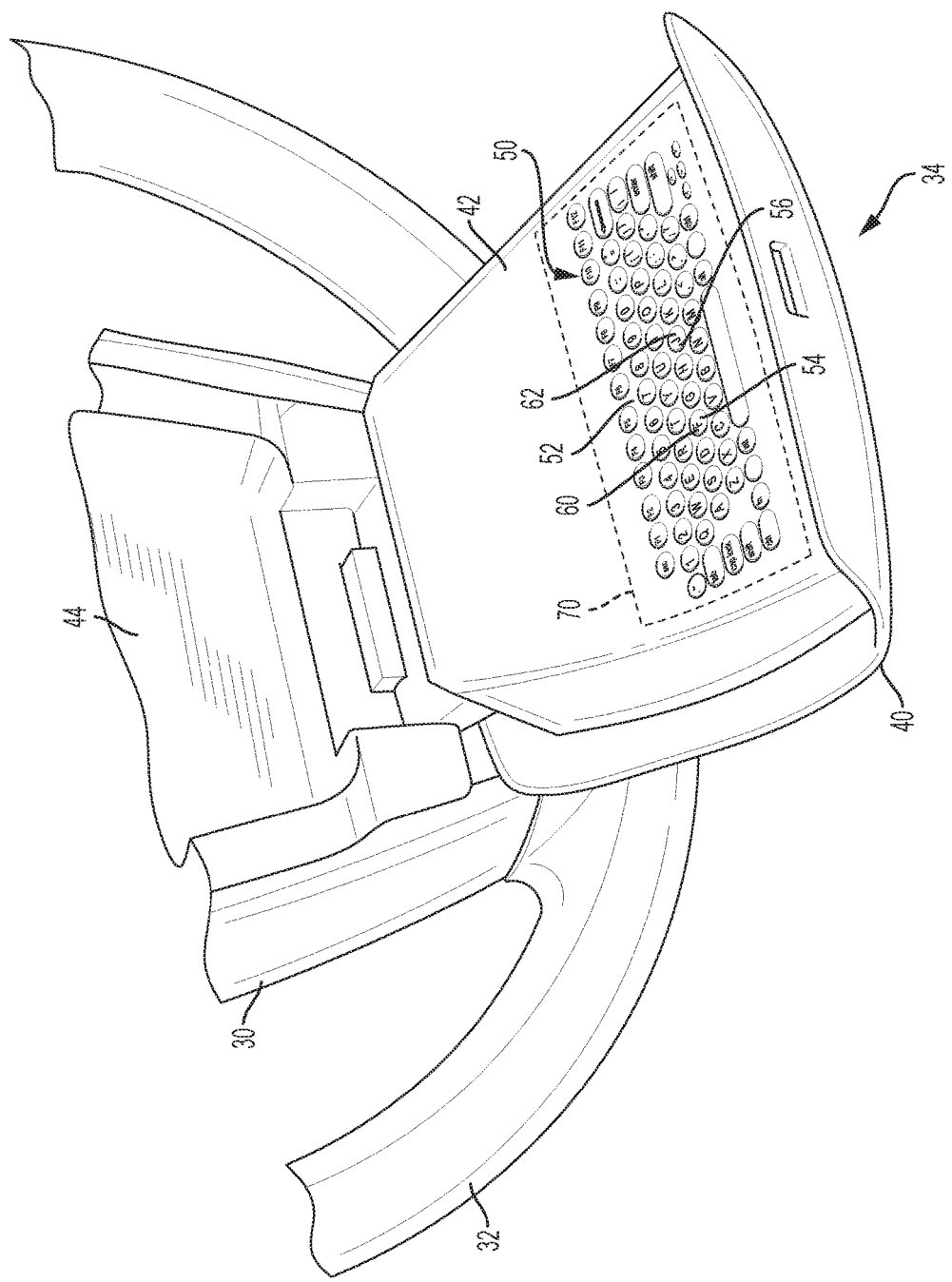

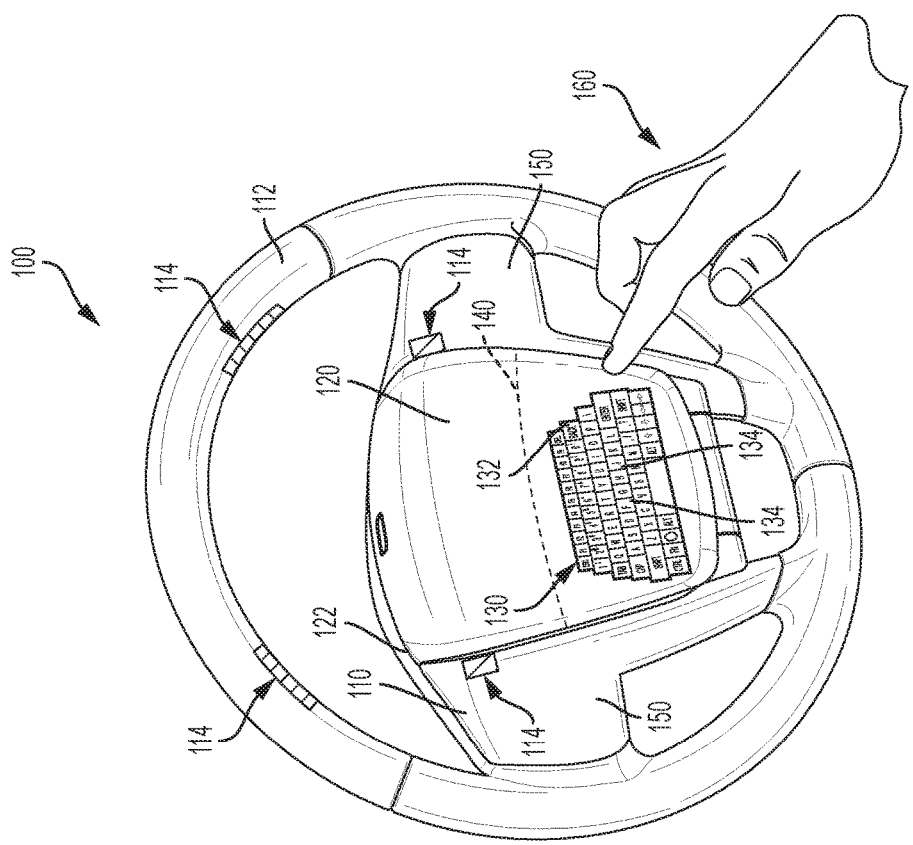

STEERING WHEEL WITH KEYBOARD

BACKGROUND OF THE INVENTION

The present disclosure relates to a steering wheel provided with a keyboard.

Vehicles may be equipped with systems and devices to semi-autonomously or autonomously control a vehicle and perform vehicle maneuvers. The systems or devices may provide driving control with minimal driver intervention to reduce the driving burden on the driver. Some systems or devices may enable a driver to remove their hands from the steering wheel when the situation may permit such hands-free operation.

SUMMARY OF THE INVENTION

In an embodiment of the present disclosure, a steering wheel assembly is provided. The steering wheel assembly includes a panel connected to a steering wheel body and an input sensor assembly disposed proximate the steering body. The panel has a first surface disposed opposite a second surface. The second surface has a keyboard template defining a plurality of key areas. The panel is moveable between a first position and a second position. The input sensor assembly is configured to detect the position of an operator within the keyboard template relative to a key area of the plurality of key areas.

In an embodiment of the present disclosure, a steering wheel assembly is provided. The steering wheel assembly includes a steering wheel body having a first surface and a second surface disposed opposite the first surface. The first surface has a keyboard template defined thereon. The keyboard template includes a plurality of key areas.

In an embodiment of the present disclosure, a steering wheel assembly is provided. A steering wheel is selectively coupled to a steering shaft. The steering wheel has a panel movably connected to a steering wheel body. The panel has a first surface and the second surface disposed opposite the first surface. The second surface has a keyboard template defining a plurality of key areas.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of a vehicle steering system having a steering wheel assembly with a panel in a closed position;

FIG. 2 is a perspective view of the steering wheel assembly having the panel in an open position;

FIG. 4 is a perspective view of a second illustrative keyboard template;

FIG. 5 is a perspective view of a third illustrative keyboard template; and

FIG. 6 is a perspective view of an illustrative steering wheel assembly.

DETAILED DESCRIPTION

Figure 3:
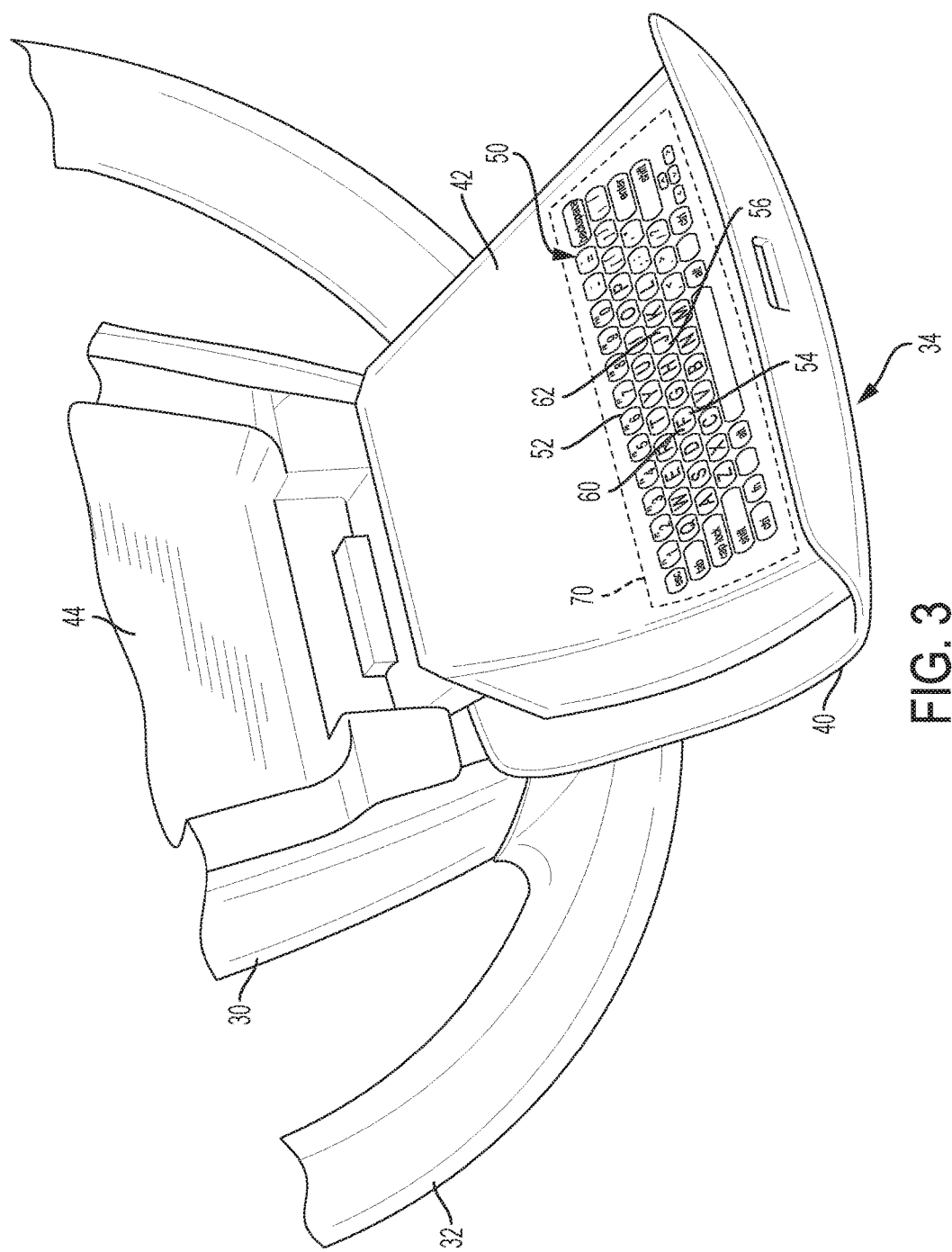
FIG. 3 is a perspective view of a first illustrative keyboard template.

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 and 2, a vehicle steering system 10 includes a steering wheel assembly 12 in communication with an autonomous driving assisted steering system 14. The vehicle steering system 10 is provided with a vehicle, such as a motor vehicle like a truck, bus, farm equipment, military transport such as a weapon or vehicle, or cargo loading equipment for land, air, or marine vessels.

The steering wheel assembly 12 may be configured to pivot a pair of vehicle wheels in response to rotation of a steering wheel 20 via a steering shaft 22. The steering shaft 22 extends through a steering column along a longitudinally extending axis. The steering wheel 20 may be directly coupled to the steering shaft 22 via a coupling mechanism. In at least one embodiment, the steering wheel 20 may not be directly coupled to the steering shaft 22 but may be provided as part of a steer-by-wire steering system arrangement or other steering arrangement. The steer-by-wire steering system arrangement may include a plurality of vehicle sensors and the autonomous driving assisted steering system 14 in communication with a vehicle controller 24 that may interpret a position of the steering wheel 20 that corresponds to an amount of angular rotation or pivoting of the steering shaft 22 that may be pivoted by an electric motor or the like.

Regardless of the configuration of the steering wheel assembly 12, the autonomous driving assisted steering system 14 may operatively disconnect the steering wheel 20 from the steering shaft 22. The steering wheel 20 may be virtually/electronically uncoupled or partially/substantially mechanically uncoupled from the steering shaft 22 such that the steering wheel 20 is in a non-rotational condition or no longer rotates while the autonomous driving assisted steering system 14 is active. The autonomous driving assisted steering system 14 may uncouple the steering wheel 20 from the steering shaft 22 mechanically or electronically via a clutch or the coupling mechanism interposed between the steering wheel 20 and the steering shaft 22. In at least one embodiment, the activation of the autonomous driving assisted steering system 14 may not operatively decouple the steering wheel 20 from the steering shaft 22 but a servo actuator may counter rotate the steering wheel 20 in response to vehicle maneuvers being performed by the autonomous driving assisted steering system 14.

The operation of the vehicle semi-autonomously or autonomously by the autonomous driving assisted steering system 14 may operatively disconnect the steering wheel 20 from the steering shaft 22 and may retract the steering wheel 20. The steering wheel 20 is retracted by displacing the steering wheel 20 forward within the vehicle or retracted into a portion of the steering column away from an operator of the vehicle because it is no longer being used by the operator of the vehicle to control the vehicle. The retraction of the steering wheel 20 may enlarge the driver's personal space for comfort and convenience.

During situations in which the steering wheel 20 is operatively disconnected from the steering shaft 22 and in a retracted position an operator of the vehicle may desire to interact with a vehicle infotainment system or other systems that may be in communication with the vehicle. The operator of the vehicle may wish to send a text or SMS message, input a desired location or other search criteria, interface with vehicle systems, or the like. Therefore, it may be desirable to provide an interface disposed on the steering wheel 20 that may permit the operator of the vehicle to provide an input while the autonomous driving assisted steering system 14 is active and the steering wheel 20 is selectively or operatively decoupled from the steering shaft 22 in a non-rotational condition.

The steering wheel 20 includes a steering wheel body 30, a steering wheel handle 32, a panel 34, and an input sensor assembly 36. The steering wheel body 30 defines a central region of the steering wheel 20. The steering wheel handle 32 extends from the steering wheel body 30. The steering wheel handle 32 extends at least partially about the steering wheel body 30. The steering wheel handle 32 defines a grip that an operator of the vehicle may rest their hands and/or grasp the steering wheel 20.

The panel 34 is movably connected to the steering wheel body 30. The panel 34 is movable between a first position or a closed position and a second position or an open position. The panel 34 may be movably connected to the steering wheel body 30 in a variety of ways, including pivotally connected such that the panel 34 flips or folds out from the steering wheel body 30. The panel 34 may be slidingly connected such that the panel 34 slides or translates from the steering wheel body 30, or any other movable connection.

The panel 34 has a first surface 40 and a second surface 42 disposed opposite the first surface 40. The first surface 40 is an exterior surface of the steering wheel 20 and faces towards the operator of the vehicle when the panel 34 is in the closed position. The panel 34 selectively covers an interior surface 44 of the steering wheel body 30 when the panel 34 is in the closed position. The interior surface 44 of the steering wheel body 30 is exposed when the panel 34 is in the open position.

The second surface 42 has a keyboard template 50 defining a plurality of key areas 52. The keyboard template 50 is not an actual keyboard that directly receives and provides inputs to the vehicle infotainment system or the vehicle controller 24, but represents a keyboard having the plurality of key areas 52 that indirectly receive and provide input to the vehicle infotainment system or the vehicle controller 24 via the input sensor assembly 36.

The plurality of key areas 52 of the keyboard template 50 are configured or sized to receive a finger of the operator's hand or an object such as a stylus, pencil, or the like. The plurality of key areas 52 may represent the keys found on a QWERTY keyboard, adaptive keyboard, or a simplified keyboard. The keyboard template 50 may also define an area representative of a trackpad or touchpad. The area representative of a trackpad or touchpad enables the operator of the vehicle to indirectly control a mouse pointer or other indicator of the vehicle infotainment system or other vehicle system via the input sensor assembly 36.

Referring to FIGS. 3-5, the keyboard template 50 may be disposed on the second surface 42 in a variety of ways such that the keyboard template 50 is substantially flush with the second surface 42 (as shown in FIG. 3), is disposed above the second surface 42 (as shown in FIG. 4), or is disposed below the second surface 42 (as shown in FIG. 5).

In at least one embodiment, the keyboard template 50 is defined on or by the second surface 42. Referring to FIG. 3, the keyboard template 50 is disposed on the second surface 42. The keyboard template 50 may be painted, stenciled, glued, or overlaid onto the second surface 42. Referring to FIG. 4 the keyboard template 50 may be reverse embossed or the like onto the second surface 42, the keyboard template 50 extends from the second surface 42 away from the first surface 40 such that at least a portion of the keyboard template 50 is disposed above the second surface 42. Referring to FIG. 5, the keyboard template 50 may be embossed, recessed, reverse embossed, imprinted, carved or the like into the second surface 42. Should the keyboard template 50 be embossed, recessed, imprinted, carved, or the like into the second surface 42, the keyboard template 50 extends from the second surface 42 towards the first surface 40 such that at least a portion of the keyboard template 50 is disposed below the second surface 42.

The keyboard template 50 includes a first protrusion 54 and a second protrusion 56. The first protrusion 54 and the second protrusion 56 may be tactile bumps. The first protrusion 54 is disposed within a first key area 60 of the plurality of key areas 52. The second protrusion 56 is disposed within a second key area 62 of the plurality of key areas 52. The first key area 60 and the second key area 62 may represent home key positions of "F" and "J". In at least one embodiment, each key area of the plurality of key areas 52 includes a protrusion extending from the second surface 42.

The input sensor assembly 36 is configured to output a signal to the vehicle controller 24 of the vehicle infotainment system indicative of a user input provided to the keyboard template 50. The user input is based on a detected position by the input sensor assembly 36 of an operator's finger 88 or an object relative to at least one key area of the plurality of key areas 52. The input sensor assembly 36 may project or define a detection area 70 disposed over the keyboard template 50.

The input sensor assembly 36 outputs a signal indicative of the position of the operator's finger or the object within the detection area 70 relative to at least one key area of the plurality of key areas 52, in response to the interruption of the detection area 70 or the presence of the operator's finger or the object within the detection area 70 relative to at least one key area of the plurality of key areas 52. The position of the operator's finger of the object within the detection area 70 relative to at least one key area of the plurality of key areas 52 is interpreted as a keystroke or user input provided at the at least one key area of the plurality of key areas 52 by the vehicle controller 24, the vehicle infotainment system, or other system.

The input sensor assembly 36 is disposed on the steering wheel handle 32. In at least one embodiment, the input sensor assembly 36 is disposed proximate the steering wheel body 30. More specifically, the input sensor assembly 36 may be disposed on the interior surface 44 of the steering wheel body 30.

The input sensor assembly 36 is positioned such that the input sensor assembly 36 faces towards and is spaced apart from the second surface 42. The input sensor assembly 36 includes a first input sensor 80 and a second input sensor 82. The first input sensor 80 is circumferentially spaced apart from the second input sensor 82. The first input sensor 80 and the second input sensor 82 may be configured as optical sensors such as lasers, planar lasers, or the like.

The panel 34 may be enabled or permitted to move from the closed position to the open position, in response to activation of the autonomous driving assisted steering system 14 in which the steering wheel 20 is selectively decoupled from the steering shaft 22. Subsequent to the opening of the panel 34, the input sensor assembly 36 is enabled to detect the position of an operator's finger relative to at least one key area of the plurality of key areas 52. The input sensor assembly 36 continues to detect for the position of the operator's finger of the object within the detection area 70 relative to at least one key area of the plurality of key areas 52 while the autonomous driving assisted steering system 14 is active. The input sensor assembly 36 is disabled from detecting the position of an operator's finger relative to at least one key area of the plurality of key areas 52, in response to the deactivation of the autonomous driving assisted steering system 14 in which the steering wheel 20 is selectively coupled to the steering shaft 22.

Referring to FIG. 6, a steering wheel assembly 100 is shown. The steering wheel assembly 100 includes a steering wheel body 110, a steering wheel handle 112, and an input sensor assembly 114. The steering wheel body 110 has a first surface 120 and a second surface 122 disposed opposite the first surface 120. The first surface 120 faces towards an operator of the vehicle. The second surface 122 faces towards the front of the vehicle.

The first surface 120 includes a keyboard template 130 having a plurality of key areas 132. In at least one embodiment, each key area of the plurality of key areas 132 protrudes or extends above the first surface 120 such that the plurality of key areas 132 are protruding keys. In at least one embodiment, each key area of the plurality of key areas 132 includes a protrusion 134 extending from the first surface 120. The protrusion 134 provides tactile identification of the characters to an operator of the vehicle. The protrusion 134 may also have the shape of the character represented by each key area of the plurality of key areas 132. For example, should the key area of the plurality of key areas 132 represent the letter "H", the protrusion 134 is a raised area having the shape of the letter "H".

The keyboard template 130 is disposed on the first surface 120 below an airbag seam line 140. The keyboard template 130 may be disposed on the first surface 120 in a variety of ways. In at least one embodiment, at least of a portion of the keyboard template 130 extends from the first surface 120 towards the second surface 122 such that at least of a portion of the keyboard template 130 and the plurality of key areas 132 are recessed or disposed below the first surface 120. In at least one embodiment, at least of a portion of the keyboard template 130 extends from the first surface 120 away from the second surface 122 such that at least of a portion of the keyboard template 130 and the plurality of key areas 132 protrudes or is disposed above the first surface 120. In at least one embodiment, at least of a portion of the keyboard template 130 and the plurality of key areas 132 are disposed substantially flush with the first surface 120.

The input sensor assembly 114 is disposed on the steering wheel body 110 and faces towards and is spaced apart from the first surface 120. The input sensor assembly 114 may be disposed on an extension portion 150 of the steering wheel body 110 that interconnects the steering wheel handle 112 and the steering wheel body 110. In at least one embodiment, the input sensor assembly 114 is disposed on the steering wheel handle 112 and faces towards the first surface 120.

The input sensor assembly 114 is an optical sensor configured to detect a position of an operator's finger/hand or an object within the keyboard template 130. More specifically, the input sensor assembly 114 detects a position of an operator's finger/hand or the object relative to at least one of the plurality of key areas 132. The input sensor assembly 114 outputs a signal indicative of the character represented by the key area of the plurality of key areas 132 proximate the operator's finger/hand 160 or the object to a vehicle controller 24 or infotainment system in response to interruption of a projected laser beam or other non-visible light that is projected towards the keyboard template 130.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A steering wheel assembly comprising:
    a panel connected to a steering wheel body, the panel having a first surface disposed opposite a second surface, the first surface being an exterior surface of the panel and the second surface being an interior surface of the panel, the second surface having a keyboard template defining a plurality of key areas, the panel being moveable between a first position and a second position; and
    an input sensor assembly disposed on the steering wheel body, the input sensor assembly configured to detect a position of an operator relative to the keyboard template or a key area of the plurality of key areas,
    wherein the keyboard template extends from the second surface away from the first surface such that a portion of the keyboard template is disposed above the second surface or the keyboard template extends from the second surface towards the first surface.

2. The steering wheel assembly of claim 1, wherein the input sensor assembly outputs a signal indicative of a user input based on a detected position of an operator's finger relative to a key area of the plurality of key areas.

3. The steering wheel assembly of claim 1, further comprising a steering wheel handle extending from the steering wheel body.

4. The steering wheel assembly of claim 3, wherein the input sensor assembly is disposed on the steering wheel handle.

5. The steering wheel assembly of claim 4, wherein the input sensor assembly includes a first input sensor circumferentially spaced apart from a second input sensor.

6. The steering wheel assembly of claim 4, wherein the input sensor assembly faces towards and is spaced apart from the second surface.

7. The steering wheel assembly of claim 1, wherein the keyboard template includes a first protrusion disposed within a first key area of the plurality of key areas.

8. The steering wheel assembly of claim 7, wherein the keyboard template includes a second protrusion disposed within a second key area of the plurality of key areas.

9. A steering wheel assembly comprising:
    a steering wheel body having a first surface and a second surface disposed opposite the first surface, the first surface having a keyboard template defined thereon, the keyboard template including a plurality of key areas; and an input sensor assembly spaced apart from the keyboard template and disposed on at least one of the steering wheel body and a steering wheel handle that extends from the steering wheel body, the input sensor assembly facing towards the first surface, the input sensor assembly being configured to detect a position of an operator relative to the keyboard template and at least one of the plurality of key areas, wherein the keyboard template extends from the first surface away from the second surface such that a portion of the keyboard template is disposed above the first surface or the keyboard template extends from the first surface toward the second surface.

10. The steering wheel assembly of claim 9, wherein each key area of the plurality of key areas includes a protrusion extending from the first surface.

11. A steering wheel assembly comprising:

a steering wheel having a panel movably connected to a steering wheel body, the panel having a first surface and a second surface disposed opposite the first surface, the second surface having a keyboard template defining a plurality of key areas, the panel is movable from a closed position to an open position, in response to activation of an autonomous driving assisted steering system.

12. The steering wheel assembly of claim 11 further comprising an input sensor assembly disposed on the steering wheel body, the input sensor assembly configured to output a signal indicative of a user input received via a key area of the plurality of key areas.

13. The steering wheel assembly of claim 12, wherein the user input is based on a detected position of an operator's finger relative to at least one key area of the plurality of key areas.

14. The steering wheel assembly of claim 12, wherein in response to activation of the autonomous driving assisted steering system, the input sensor assembly is enabled to detect a position of an operator's finger relative to at least one key area of the plurality of key areas.

15. The steering wheel assembly of claim 14, wherein in response to deactivation of the autonomous driving assisted steering system, the input sensor assembly is disabled.

\* \* \* \* \*